United States Patent [19]

Yoshimura et al.

[11] Patent Number: 5,091,854
[45] Date of Patent: Feb. 25, 1992

[54] CONTROL SYSTEMS FOR VEHICLE ENGINES COUPLED WITH AUTOMATIC TRANSMISSIONS

[75] Inventors: Hiroshi Yoshimura; Keiji Bota; Kazuo Takemoto, all of Hiroshima; Fumiaki Baba, Higashihiroshima, all of Japan

[73] Assignee: Mazda Motor Corporation, Hiroshima, Japan

[21] Appl. No.: 356,451

[22] Filed: May 23, 1989

[30] Foreign Application Priority Data

May 26, 1988 [JP] Japan ................ 63-126969

[51] Int. Cl.$^5$ .............................................. B60K 41/04
[52] U.S. Cl. ........................ 364/424.1; 364/431.03; 74/866
[58] Field of Search ........... 364/424.1, 431.03, 431.04, 364/431.07; 74/866, 858, 851; 123/492, 493

[56] References Cited

U.S. PATENT DOCUMENTS

| | | | |
|---|---|---|---|
| 4,226,141 | 10/1980 | Espenschied | 74/858 |
| 4,266,447 | 5/1981 | Hees et al. | 74/858 |
| 4,355,550 | 10/1982 | Will et al. | 74/858 |
| 4,370,903 | 2/1983 | Stroh et al. | 74/858 |
| 4,370,904 | 2/1983 | Müller et al. | 74/858 |
| 4,403,527 | 9/1983 | Mohl et al. | 74/858 |
| 4,680,988 | 7/1987 | Mori | 364/424.1 |
| 4,691,285 | 9/1987 | Takeda | 364/424.1 |
| 4,744,031 | 5/1988 | Takeda et al. | 364/424.1 |
| 4,770,064 | 9/1988 | Kuerschner | 74/866 |
| 4,811,223 | 3/1989 | Iwatsuki et al. | 364/424.1 |

Primary Examiner—Parshotam S. Lall
Assistant Examiner—V. Trans
Attorney, Agent, or Firm—Sixbey, Friedman, Leedom & Ferguson

[57] ABSTRACT

A control system for a vehicle engine coupled with an automatic transmission, which comprises a detecting portion for detecting a condition of speed change operation in the automatic transmission, a speed sensor for detecting engine speed or turbine speed in the automatic transmission, a first period determining portion for determing a first period of time, in which the speed change operation is to be carried out, by calculation based on the speed detected by the speed sensor, a second period determining portion for determining a second period of time, in which the speed change operation is to be carried out, in accordance with a predetermined lapse of time after the condition of the speed change operation is selected, and a torque control portion operative to vary torque produced by the vehicle engine to suppress torque shock resulting from the speed change operation during the first period of time when a condition of shifting-up operation is detected by the detecting portion and to vary the torque so as to suppress torque shock resulting from the speed change operation during the second period of time when a condition of predetermined shifting-down operation is detected by the detecting portion.

15 Claims, 14 Drawing Sheets

FIG. 6A  V
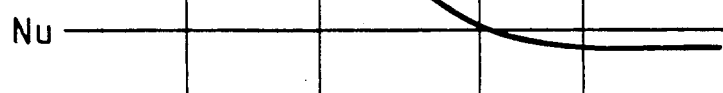
FIG. 6B
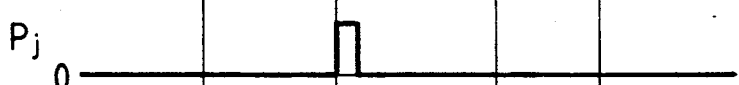
FIG. 6C  $P_j$
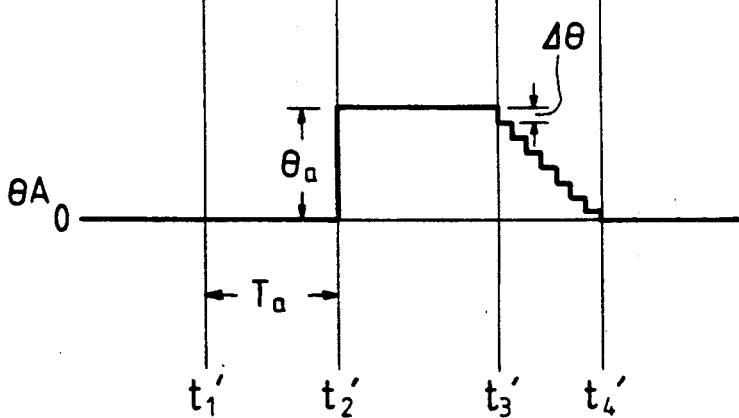
FIG. 6D  $\theta A$ FIG. 7A  $P_j$
FIG. 7B  $\theta A$
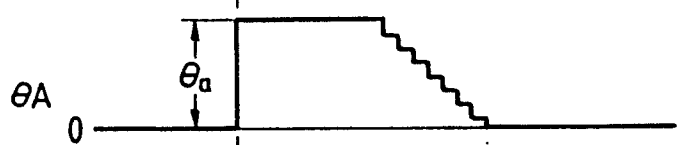
FIG. 7C  $\theta K$
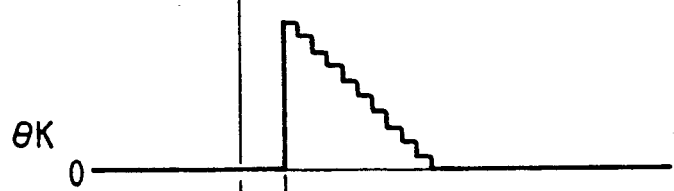
FIG. 7D  $\theta R$
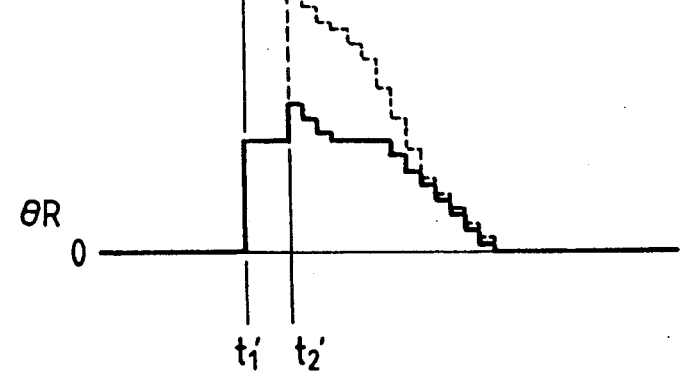
$t_1'$  $t_2'$

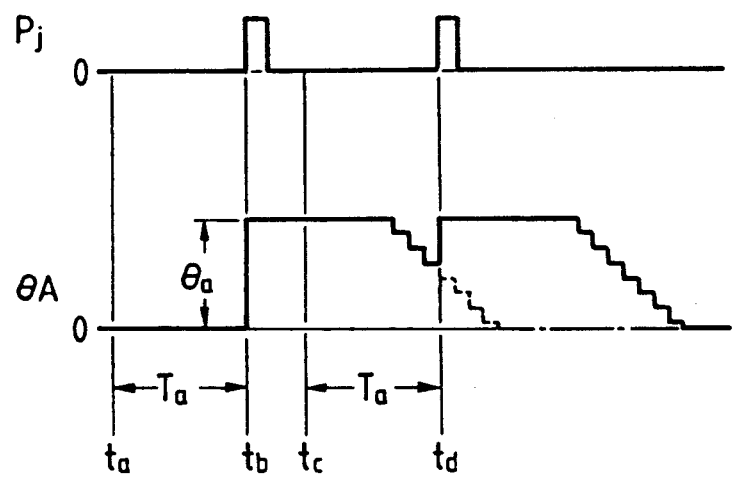
FIG. 8A
FIG. 8B
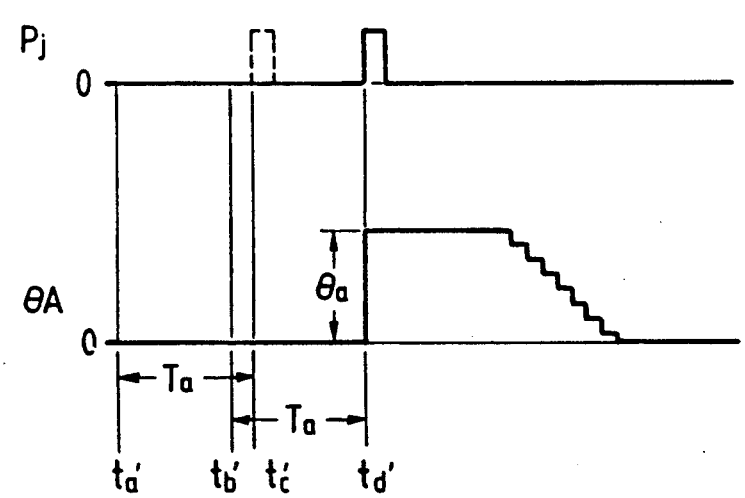
FIG. 9A
FIG. 9B

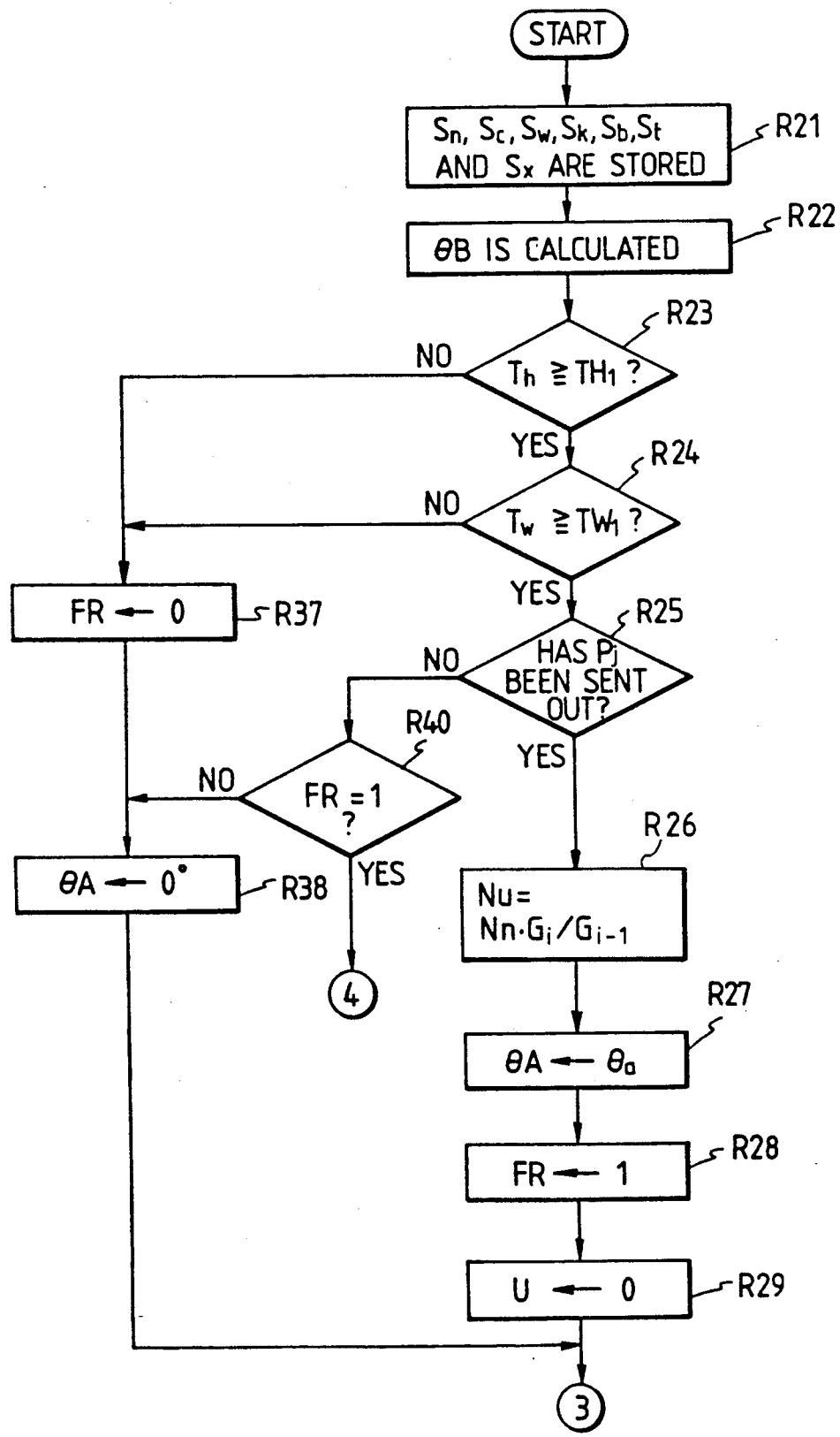
FIG. 11-a

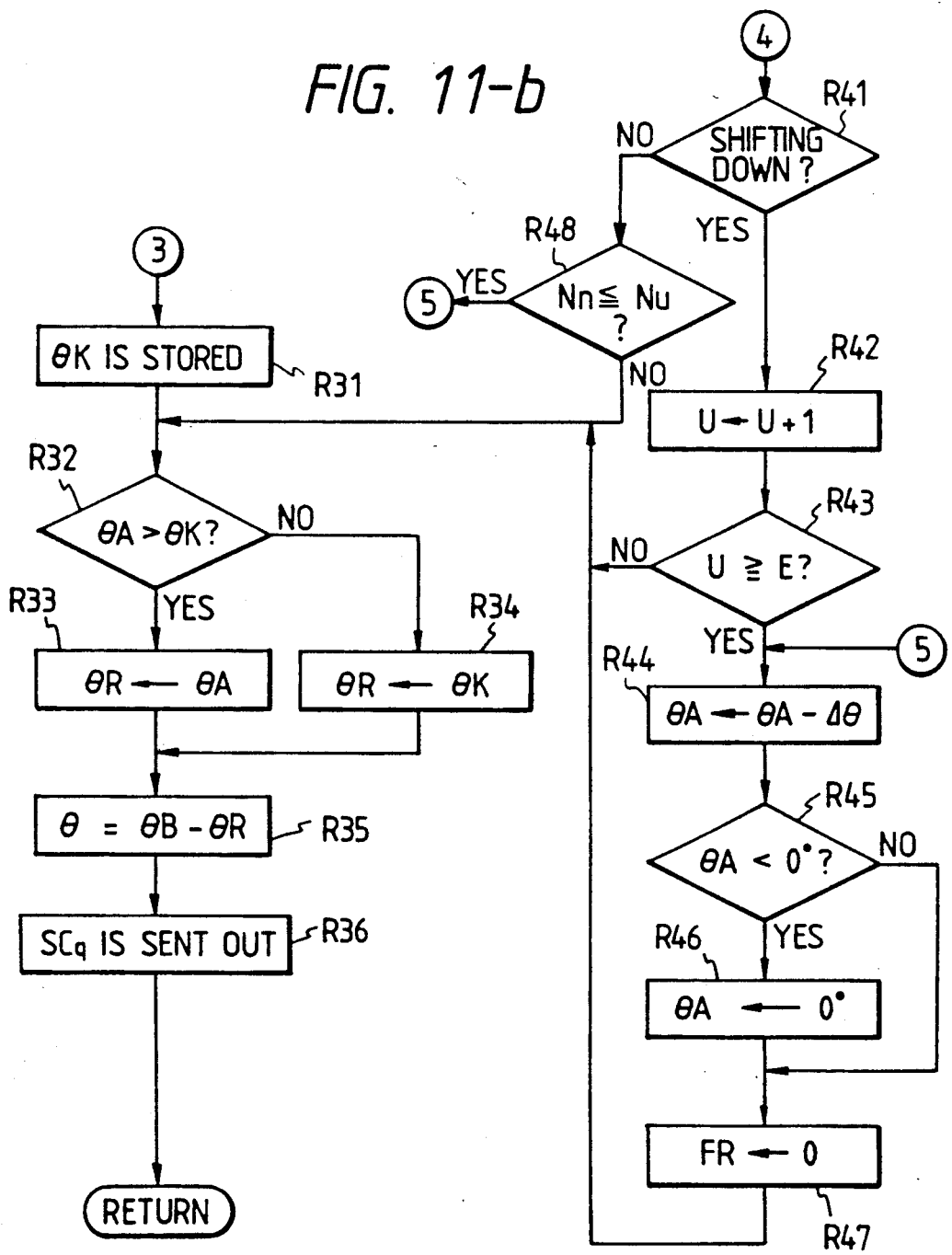
FIG. 11-b

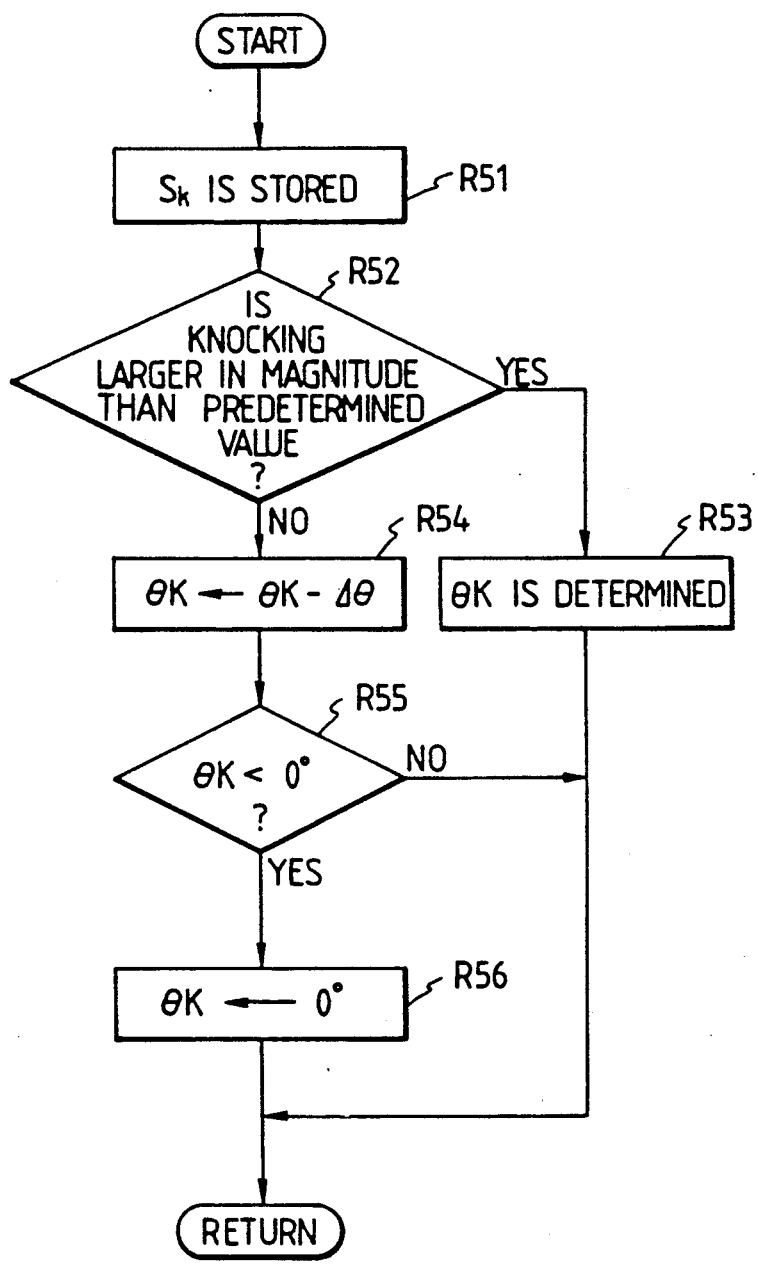

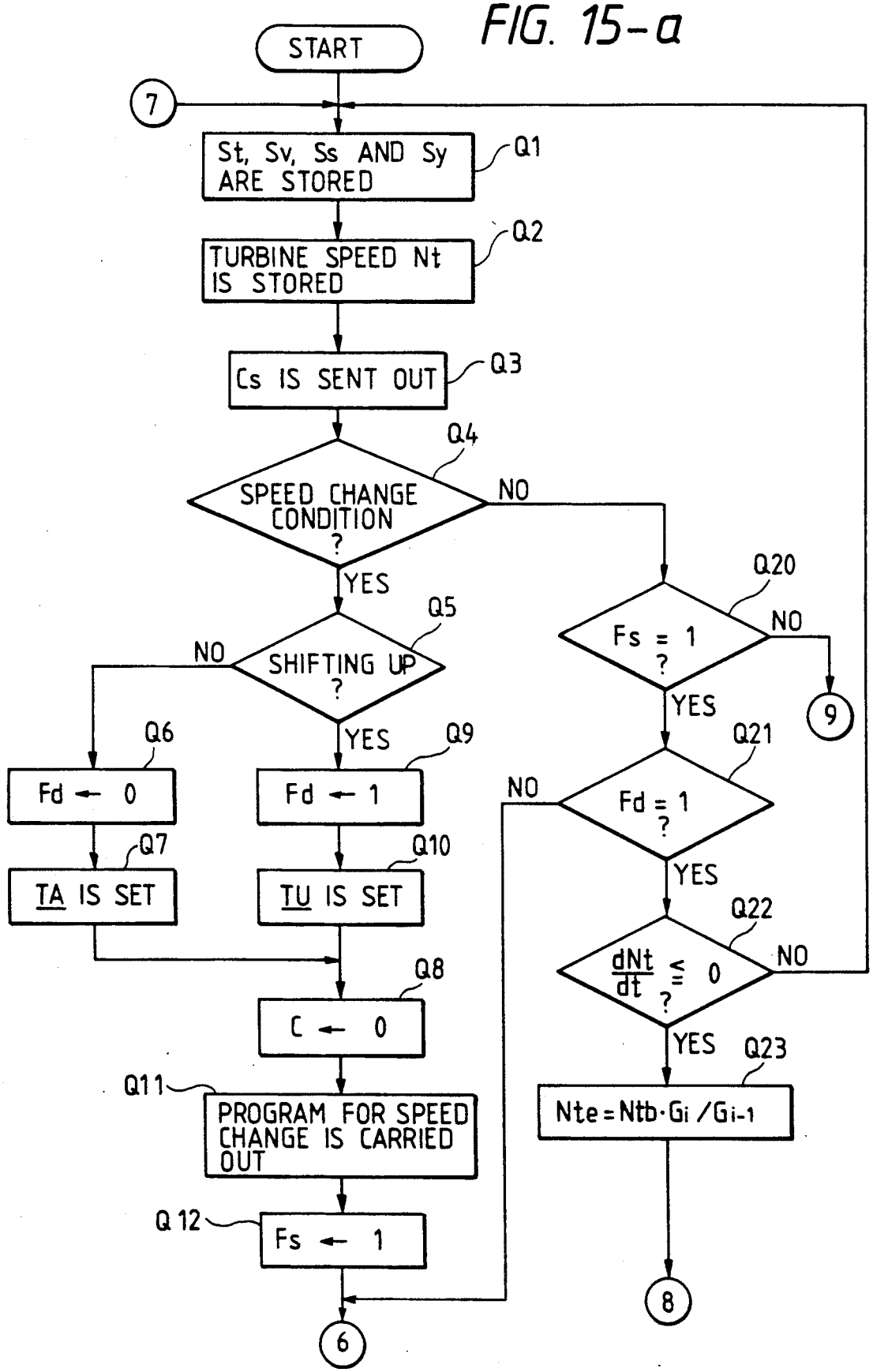
FIG. 15-a

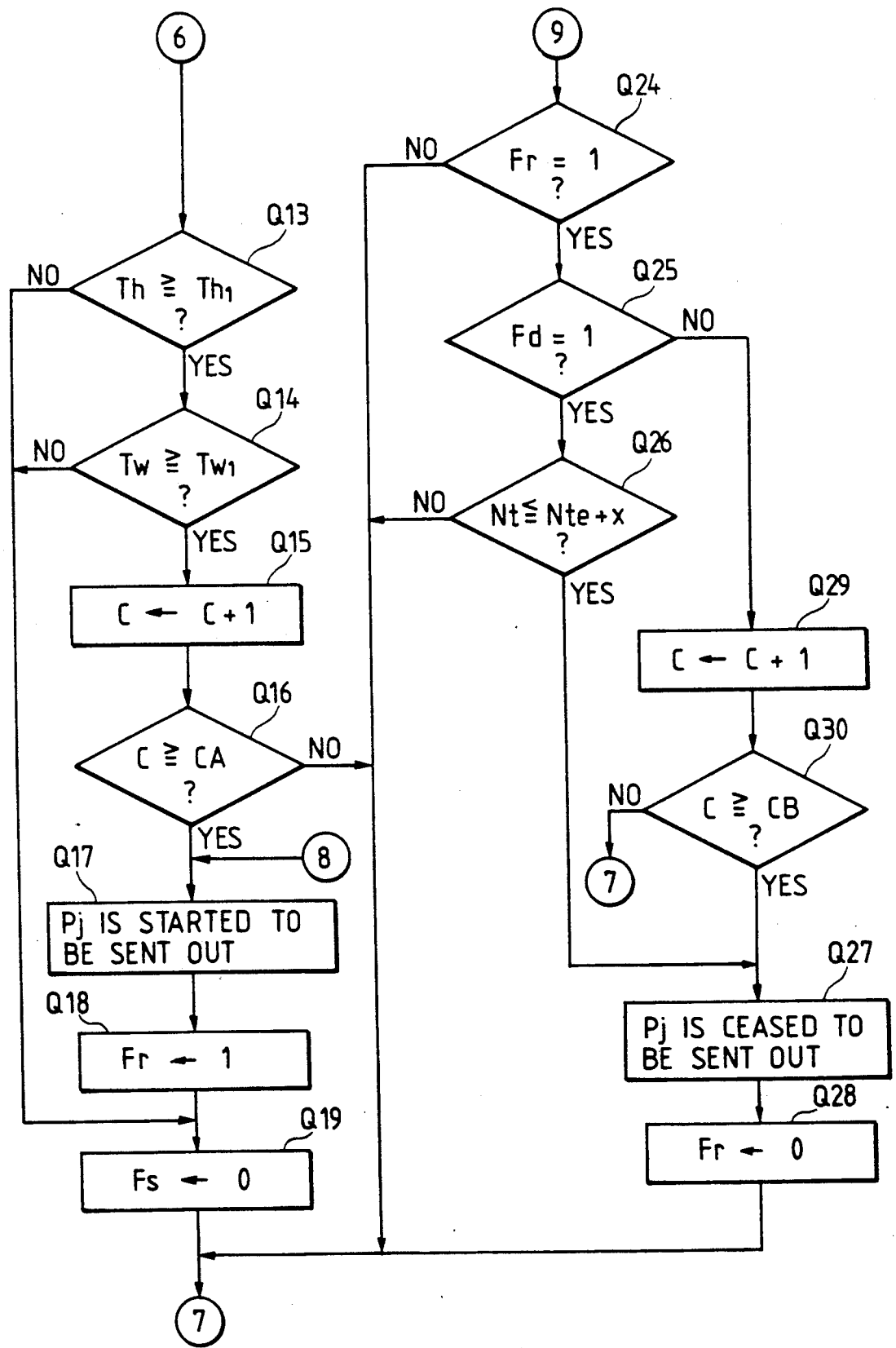
FIG. 15-b

CONTROL SYSTEMS FOR VEHICLE ENGINES COUPLED WITH AUTOMATIC TRANSMISSIONS

BACKGROUND OF THE INVENTION

1. Field of the Invention

The present invention relates generally to control systems for vehicle engines coupled with automatic transmissions, and more particularly, to a system for controlling an output of a vehicle engine which is coupled with an automatic transmission employed in a vehicle so as to suppress torque shocks brought about by speed change operations performed in the automatic transmission.

2. Description of the Prior Art

There has been commonly used in vehicles an automatic transmission which is coupled with an engine provided in the vehicle and includes a torque converter comprising a pump impeller, a turbine runner and a stator, and a power transmitting gear arrangement including a speed change mechanism connected to the turbine runner in the torque converter. Such an automatic transmission employed to be coupled with the engine in the vehicle is usually accompanied with a hydraulic pressure control device including an oil hydraulic control circuit, by which engaging friction elements, such as clutch and brake elements, operating with oil pressure in the speed change mechanism are caused to work for a speed change operation.

When the speed change operation is carried out in the automatic transmission accompanied with the hydraulic pressure control device, sudden rise or down in speed of the engine is caused in response to variations in gear ratio in the speed change mechanism and thereby sudden variations in torque are caused on an output shaft of the automatic transmission. This results in that torque shock on the vehicle is brought about by each speed change operation performed in the automatic transmission.

With the intention of suppressing the torque shock resulting from the speed change operation, it is considered to adjust oil pressure applied to the engaging friction elements so that each engaging friction element comes into engagement or disengagement gradually and smoothly. In such a case, however, a period of time in which the engaging friction element is kept in a slipping condition in process of the speed change operation is protracted and therefore it is feared that the engaging friction element is subjected to seizure and abrasion of great degree.

In view of this, there has been proposed to reduce torque produced by the engine (engine torque) for a predetermined duration on the occasion of the speed change operation so as to suppress the torque shock resulting from the speed change operation, as disclosed in, for example, the Japanese patent application published before examination under publication number 61-104128. In the case where the engine torque is thus reduced for suppressing the torque shocks, for example, ignition timing is selected as a controlled subject for varying the engine torque and controlled to be retarded, compared with a normal ignition timing, so as to reduce the engine torque during the speed change operation.

In the control for varying the engine torque so as to suppress the torque shock resulting from the speed change operation as described above, it is required to detect a starting time point at which the speed change operation is actually commenced in the automatic transmission and an ending time point at which the speed change operation is actually terminated in the automatic transmission. For fulfilling such a requirement, since it is quite difficult to detect directly the starting and ending time points on the strength of variations in the operating condition of each of the engaging friction elements employed in the speed changing mechanism in the automatic transmission, each of the starting and ending time points is determined by means of calculation. The starting time point at which either a shifting-up operation or a shifting-down operation is to be commenced can be calculated relatively easily and accurately in consideration of delay in operating oil supply to the engaging friction elements in the speed change mechanism, variations in engine speed and so on. The ending time point at which the shifting-up operation is to be terminated can be also calculated relatively easily and accurately based on an engine speed which is to be taken immediately after the shifting-up operation and calculated based on an engine speed taken immediately before the shifting-up operation and gear ratios taken in the speed changing mechanism before and after the shifting-up operation, respectively, because the shifting-up operation is usually carried out without bringing about variations in output of the engine. To the contrary, the ending time point at which the shifting-down operation is to be terminated is not able to be accurately obtained be means of calculation conducted in the same manner as the calculation of the ending time point at which the shifting-up operation is to be terminated because the shifting-down operation is usually carried out with increase in gear ratio in the speed change mechanism and increase in output of the engine.

However, in the prior art, the above mentioned difficulty in calculation of the ending time point of the shifting-down operation has not been taken into consideration, and both the ending time point of the shifting-up operation and the ending time point of the shifting-down operation are calculated based on the engine speed in the same manner. Therefore, it is feared that a calculated ending time point of the shifting-down operation does not coincide with an actual ending time point of the shifting-down operation, so that the control for varying the engine torque so as to suppress the torque shock resulting from the speed change operation carried out in the automatic transmission is not performed timely.

OBJECTS AND SUMMARY OF THE INVENTION

Accordingly, it is an object of the present invention to provide a control system for a vehicle engine coupled with an automatic transmission, in which a control for varying torque produced by the vehicle engine so as to suppress torque shock resulting from a speed change operation carried out in the automatic transmission are performed, and which avoids the aforementioned disadvantages and problems encountered with the prior art.

Another object of the present invention is to provide a control system for a vehicle engine coupled with an automatic transmission, in which a control for varying torque produced by the vehicle engine so as to suppress torque shock resulting from a speed change operation carried out in the automatic transmission is performed and a period of time in which the above mentioned control is effected is determined to correspond appropriately to a period of time in which the speed change operation is actually carried out in the automatic transmission.

A further object of the present invention is to provide a control system for a vehicle engine coupled with an automatic transmission, in which a control for varying torque produced by the vehicle engine so as to suppress torque shock resulting from a speed change operation carried out in the automatic transmission is performed during a period of time having starting and ending time points which are determined with improved preciseness to correspond respectively to an actual starting time point at which the speed change operation is actually commenced in the automatic transmission and an actual ending time point at which the speed change operation is actually terminated in the automatic transmission.

In accordance with the present invention, there is provided a control system for a vehicle engine coupled with an automatic transmission comprising a speed change operation detecting portion for detecting a condition of speed change operation for varying a gear ratio in a power transmitting gear arrangement provided in the automatic transmission, a speed sensor for detecting speed of the vehicle engine or speed of a turbine of a torque converter employed in the automatic transmission, a first period determining portion for determining a first period of time, in which the speed change operation is to be carried out in the automatic transmission, by means of calculation based on the speed detected by the speed sensor, a second period determining portion for determining a second period of time, in which the speed change operation is to be carried out in the automatic transmission, in accordance with a predetermined lapse of time after a detection output of the speed change operation detector is obtained, and a torque control portion operative to vary torque produced by the vehicle engine so as to suppress torque shock resulting from the speed change operation during the first period of time determined by the first period determining portion when a condition of shifting-up operation is detected by the speed change operation detecting portion and to vary the torque so as to suppress torque shock resulting from the speed change operation during the second period of time determined by the second period determining portion when a condition of predetermined shifting-down operation is detected by the speed change operation detecting portion.

In the control system thus constituted in accordance the present invention, the first period of time in which the shifting-up operation is to be carried out in the automatic transmission is determined by means of calculation based on the speed of the vehicle engine or the speed of the turbine of the torque converter employed in the automatic transmission, so that the torque produced by the vehicle engine is varied to suppress the torque shock resulting from the shifting-up operation during the first period of time determined when the predetermined shifting-up operation is carried out in the automatic transmission, and the second period of time in which the shifting-down operation is to be carried out in the automatic transmission is determined in accordance with the predetermined lapse of time after the condition of the shifting-down operation is detected, so that the torque produced by the vehicle engine is varied to suppress the torque shock resulting from the shifting-down operation during the second period of time determined when the shifting-down operation is carried out in the automatic transmission. With such arrangements, both starting and ending time points of each of the first period of time and the second period of time are determined with improved preciseness so as to correspond respectively to an actual starting time point at which the speed change operation is actually commenced in the automatic transmission and an actual ending time point at which the speed change operation is actually terminated in the automatic transmission. Therefore, a control for varying the torque produced by the vehicle engine is performed appropriately to suppress effectively the torque shock resulting from each of the shifting-up operation and shifting-down operation carried out in the automatic transmission.

The above, and other objects, features and advantages of the present invention will become apparent from the following detailed description which is to be read in conjunction with the accompanying drawings.

BRIEF DESCRIPTION OF THE DRAWINGS

FIGS. 5A to 5D, 6A to 6D, 7A to 7D, 8A, 8B, 9A and 9B are time charts used for explaining a first example of control operation of the embodiment shown in FIG. 2;

FIGS. 10, 11-a, 11-b and 12 are flow charts showing operational programs carried out for the first example of control operation in a microcomputer used in a control unit employed in the embodiment shown in FIG. 2;

FIGS. 15-a, 15-b and 16 are flow charts showing operational programs carried out for the second example of control operation in the microcomputer used in the control unit employed in the embodiment shown in FIG. 2.

DESCRIPTION OF THE PREFERRED EMBODIMENT

Figure 1:
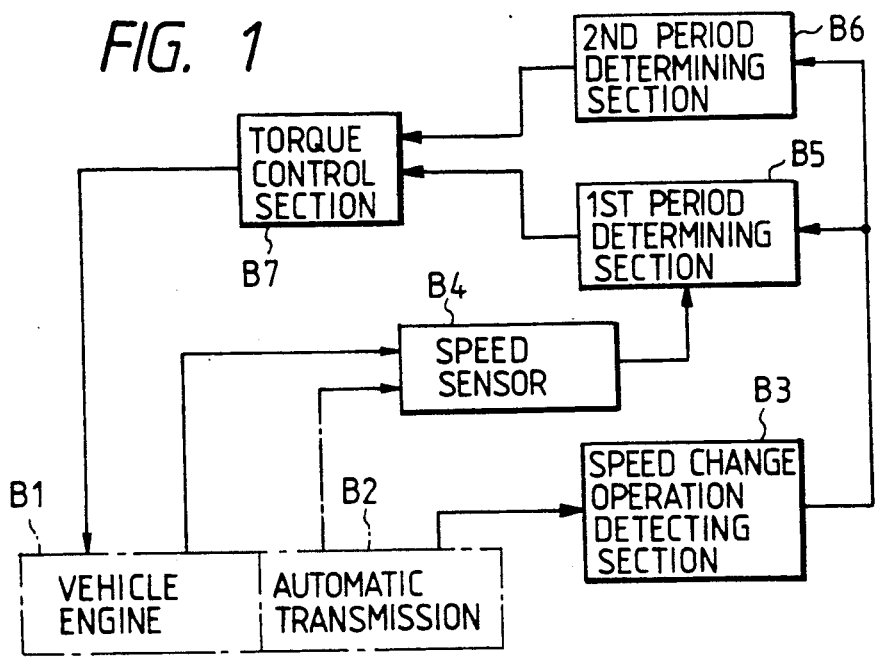
FIG. 1 is a block diagram illustrating the basic arrangement of a control system for a vehicle engine coupled with an automatic transmission according to the present invention.

FIG. 1 illustrates a functional block diagram of a system incorporating the present invention. In the functional block diagram of FIG. 1, the system comprises a vehicle engine B1 coupled with an automatic transmission B2, a speed change operation detecting section B3, a speed sensor B4, a first period determining section B5, a second period determining section B6, and a torque control section B7.

The speed change operation detecting section B3 is operative to detect a speed change operation, that is, a shifting-up operation or shifting-down operation for varying a gear ratio in a power transmitting gear arrangement provided in the automatic transmission B2. The speed sensor B4 is operative to detect speed of the vehicle engine B1 or speed of a turbine of a torque converter employed in the automatic transmission B2. The first period determining section B5 is operative to determine a first period of time, in which the speed change operation is to be carried out in the automatic transmission B2, by means of calculation based on the speed detected by the speed sensor B4, and the second period determining section B6 is operative to determine a second period of time, in which the speed change operation is to be carried out in the automatic transmission B2, in accordance with a predetermined lapse of time after a detection output of the speed change operation detecting section B3 is obtained. The torque control section B7 is operative to vary torque produced by the vehicle engine B1 so as to suppress torque shock resulting from the speed change operation during the first period of time determined by the first period determining section B5 when a condition of shifting-up operation is detected by the speed change operation detecting section B3 and to vary the torque so as to suppress torque shock resulting from the speed change operation during the second period of time determined by the second period determining section B6 when a condition of predetermined shifting-down operation is detected by the speed change operation detecting section B3.

Figure 2:
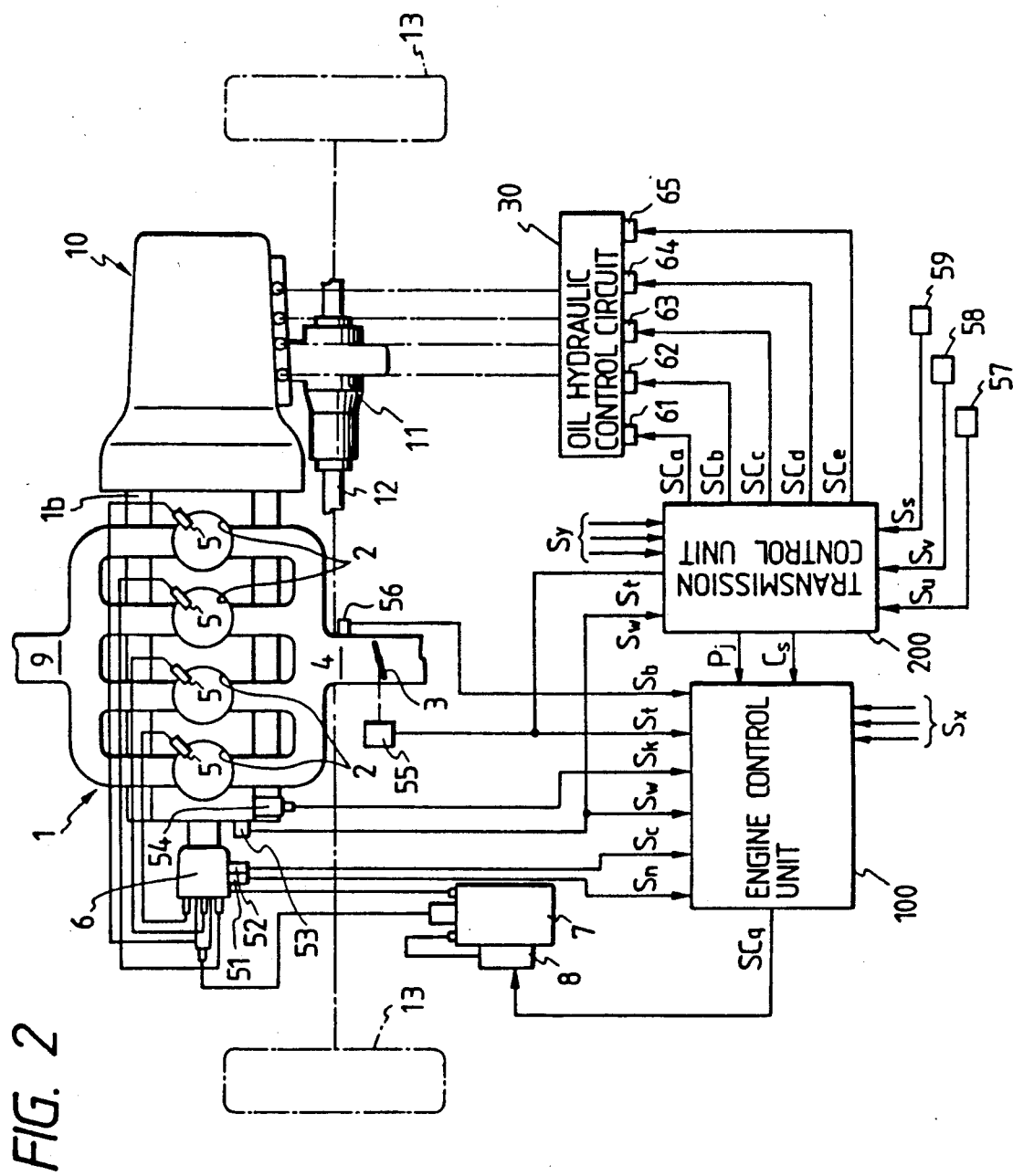
FIG. 2 is a schematic illustration showing an embodiment of control system for a vehicle engine coupled with an automatic transmission according to the present invention, together with essential portions of a vehicle engine to which the embodiment is applied.

FIG. 2 illustrates an embodiment of control system for a vehicle engine coupled with an automatic transmission according to the present invention, together with a vehicle engine which is mounted on a vehicle of the front engine-front drive type and to which the embodiment is applied.

Referring to FIG. 2, a vehicle engine 1 has four cylinders 2 each supplied with air-fuel mixture through an intake passage 4 provided with a throttle valve 3. The air-fuel mixture taken in each of the cylinders 2 is subjected to combustion caused by the operation of an ignition system including spark plugs 5, a distributor 6, an ignition coil 7 and an ignitor 8, and exhaust gas resulted from the combustion is discharged through an exhaust passage 9. With such combustion of the air-fuel mixture in each of the cylinders 2, a torque is produced on a crank shaft of the vehicle engine 1. The torque obtained from the vehicle engine 1 is transmitted through an automatic transmission 10 which is coupled with the vehicle engine 1, a differential gear mechanism 11 and a front axle 12 to a couple of front wheels 13.

Figure 3:
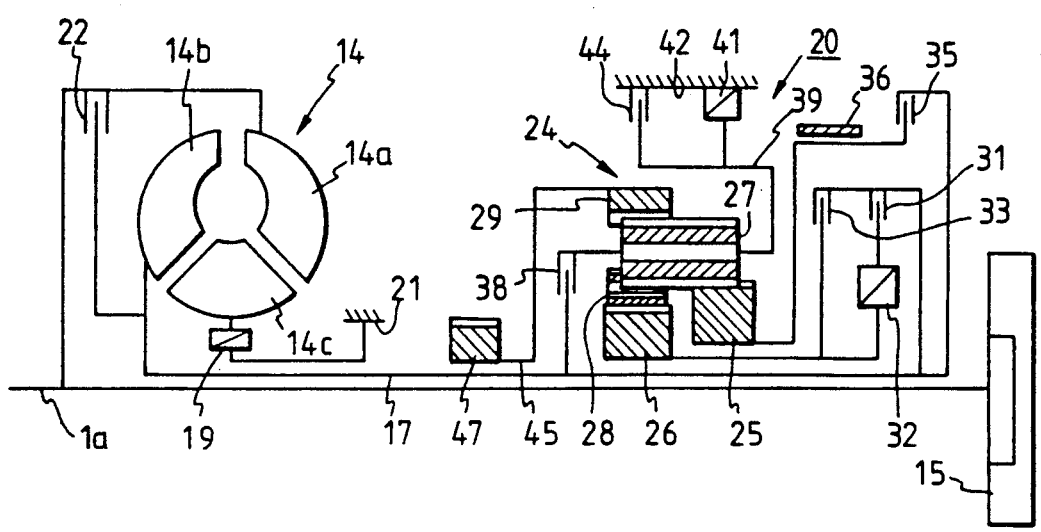
FIG. 3 is a schematic illustration showing an example of an automatic transmission accompanying with the engine to which the embodiment shown in FIG. 2 is applied.

The automatic transmission 10 is accompanied with an oil hydraulic control circuit 30 provided with solenoid valves 61, 62, 63, 64 and 65 for supplying various portions of the automatic transmission 10 selectively with operating oil pressure and, as shown in FIG. 3, comprises a torque converter 14 and a power transmitting gear arrangement 20. The torque converter 14 comprises a pump impeller 14a, a turbine runner 14b, a stator 14c and a case 21. The pump impeller 14a is secured to a crank shaft 1a of the vehicle engine 1 on which an oil pump 15 is mounted. The turbine runner 14b is coupled through a tubular turbine shaft 17 with the power transmitting gear arrangement 20 and coupled also through a lock-up clutch 22 with the crank shaft 1a. The stator 14c is coupled rotatably through a one-way clutch 19 with the case 21 and the one-way clutch 19 permits the stator 14c to revolve only in a direction common to the revolution of the pump impeller 14a.

The power transmitting gear arrangement 20 is provided with a planetary gear unit 24 for obtaining four forward speeds and one reverse speed. The planetary gear unit 24 comprises a large sun gear 25, a small sun gear 26, a long pinion gear 27, a short pinion gear 28 and a ring gear 29. A series connection of a forward clutch 31 for forward traveling and a one-way clutch 32 is disposed in parallel with a coast clutch 33 between the small sun gear 26 and the tubular turbine shaft 17. A reverse clutch 35 for reverse traveling and a 2-4 brake device 36 are connected in series between the large sun gear 25 and the tubular turbine shaft 17. A 3-4 clutch 38 is provided between the long pinion gear 27 and the tubular turbine shaft 17, and the long pinion gear 27 is coupled through a carrier 39 of the planetary gear unit 24 and a one-way clutch 41 with a case 42 of the power transmitting gear arrangement 20. The carrier 39 is selectively engaged through a low/reverse brake device 44 with the case 42. The ring gear 29 is connected through an output shaft 45 of the planetary gear unit 24 to an output gear 47, so that the torque obtained on the output shaft 45 is transmitted through idlers or the like to the differential gear mechanism 11.

In the power transmitting gear arrangement 20 constituted as described above, a plurality of shift positions including P (parking) position, R (reverse) position, N (neutral) position, D (driving) position, 1st position and 2nd position, and a plurality of speed range including first to fourth speed ranges at the D position, first to third speed ranges at the 2nd position, and first and second speed ranges at the 1st position, are obtained by causing the forward clutch 31, coast clutch 33, reverse clutch 35, 3-4 clutch 38, 2-4 brake device 36 and low/reverse brake device 44, each of which is formed into an engaging friction element, to work selectively. The first and second speed ranges are provided with relatively large gear ratios, respectively, and the third and fourth speed ranges are provided with relatively small gear ratios, respectively. The gear ratios provided for the first to fourth speed ranges respectively are decreased in order.

In the following Table 1, there are given the relationship in operation of the respective shift positions and speed ranges with the clutches and brake devices in the above configuration:

TABLE 1

| Shift position | Speed range | Clutch | | | | Brake device | | One-way clutch | |
|---|---|---|---|---|---|---|---|---|---|
| | | 31 | 33 | 38 | 35 | 36 | 44 | 32 | 41 |
| P | | | | | | | | | |
| R | | | | | o | | o | | |
| N | | | | | | | | | |
| D | 1st speed | o | | | | | | o | o |
| | 2nd speed | o | | | | o | | o | |
| | 3rd speed | o | o | o | | | | o | |
| | 4th speed | o | | o | | o | | (o) | |
| 2nd | 1st speed | o | | | | | | o | o |
| | 2nd speed | o | o | | | o | | o | |
| | 3rd speed | o | o | o | | | | o | |
| 1st | 1st speed | o | o | | | | o | o | |
| | 2nd speed | o | o | | | o | | o | |

In Table 1, each circular mark:o represents that the device is held in engagement to transmit power and a parenthesized circular mark:(o) represent that the device is held in engagement without participating in power transmission.

The operating oil pressure for working each of the clutches 31, 33, 38 and 35 and the brakes 36 and 44 is produced in the oil hydraulic control circuit 30.

In the embodiment shown in FIG. 2, an engine control unit 100 which contained a microcomputer and a transmission control unit 200 which contains also a microcomputer are provided for controlling the operation of a combination of the vehicle engine 1 and the automatic transmission 10 constituted as described above.

The engine control unit 100 is supplied with a detection output signal Sn obtained from an engine speed sensor 51 provided on the distributor 6, a detection output signal Sc obtained from a crank angle sensor 52 provided on the distributor 6, a detection output signal Sw obtained from a temperature sensor 53 provided on an engine block 1b, a detection output signal Sk obtained from a knocking sensor 54 provided on the engine block 1b, a detection output signal St obtained from a throttle sensor 55, a detection output signal Sb obtained from a negative pressure sensor 56 disposed at a portion of the intake passage 4 downstream to the throttle valve 3 and other necessary detection output signals Sx, and operative to generate an ignition control signal SCq based on the detection output signals Sn, Sc, Sw, Sk, St and Sb, and a command signal Pj and a speed indicating signal Cs each of which is supplied selectively to the engine control unit 100 from the transmission control unit 200 and to supply the ignitor 8 with the ignition control signal SCq so as to perform an ignition timing control.

The transmission control unit 200 is supplied with the detection output signal Sw from the temperature sensor 53, the detection output signal St from the throttle sensor 55, a detection output signal Su obtained from a turbine speed sensor 57, a detection output signal Sv obtained from a speed sensor 58, a detection output signal Ss obtained from a shift position sensor 59 and other necessary detection output signals Sy, and operative to supply the solenoid valves 61 to 65 respectively with driving pulse signals SCa, SCb, SCc, SCd and SCe produced based on the detection output signals Sw, St, Su, Sv and Ss so as to perform a speed change control for the automatic transmission 10 in which each of the clutches 31, 33, 38 and 35 and the brakes 36 and 44 is selectively engaged in such a manner as shown in Table 1 and further a lock-up control in which the lock-up clutch 22 provided in the torque converter 14 is selectively engaged.

Figure 4:
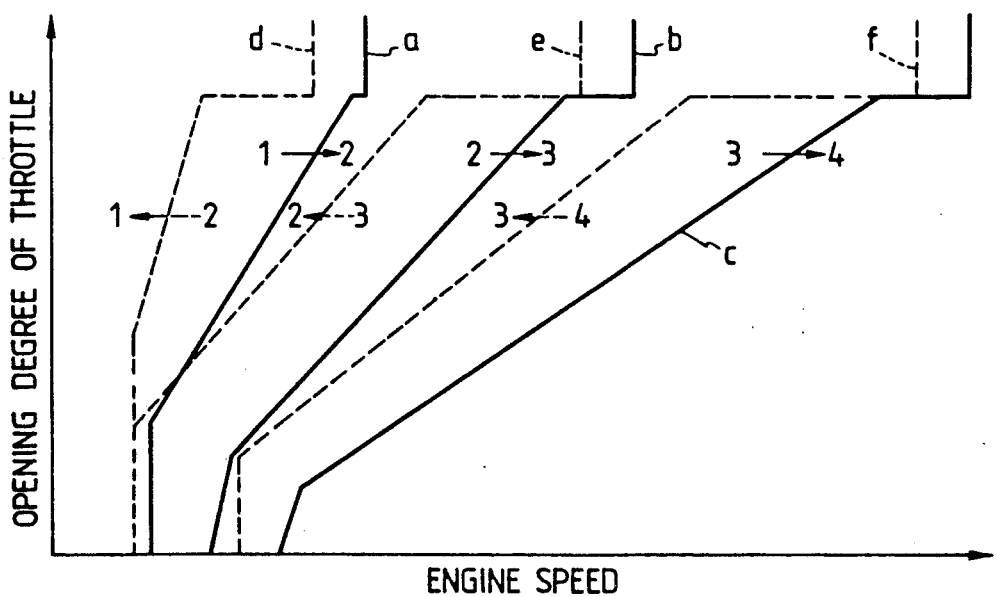
FIG. 4 shows a speed change characteristic map used for explaining the operation of the embodiment shown in FIG. 2.

On the occasion of an example of speed change control according to the present invention, in the transmission control unit 200, en engine load embodied by the throttle opening degree represented by the detection output signal St and the traveling speed of the vehicle represented by the detection output signal Sv are checked up on shifting-up and shifting-down lines in a predetermined speed change characteristic map, for example, as shown in FIG. 4, which has shifting-up lines a, b, and c for first to second shifting up (1→2), second to third shifting up (2→3) and third to fourth shifting up (3→4), respectively, and shifting-down lines d, e and f for second to first shifting down (2→1), third to second shifting down (3→2) and fourth to third shifting down (4→3), and a first to second shifting-up operation which causes a change from the first speed range to the second speed range, a second to third shifting-up operation which causes a change from the second speed range to the third speed range, a third to fourth shifting-up operation which causes a change from the third speed range to the fourth speed range, a second to first shifting-down operation which causes a change from the second speed range to the first speed range, a third to second shifting-down operation which causes a change from the third speed range to the second speed range, or a fourth to third shifting-down operation which causes a change from the fourth speed range to the third speed range is detected based on a result of the checking up.

When one of the shifting-down operations except the fourth to third shifting-down operation, that is, the second to first shifting-down operation or the third to second shifting-down operation which is apt to cause relatively large torque shock on the vehicle, is detected under a condition in which the vehicle engine 1 is operating with, for example, the throttle opening degree which is equal to or larger than $TH_1$ corresponding to one eighth the maximum value and the cooling water temperature which is equal to or higher than $TW_1$ set to be equal to or higher than 70° C., the command signal Pj is supplied to the engine control unit 100 from the transmission control unit 200 after a predetermined period, for example, 100 msec, which is selected to correspond to time lag in operation of the power transmitting gear arrangement 20, has elapsed since the second to first or third to second shifting-down operation was detected, on the condition that a different shifting-up or shifting-down operation is not detected in the predetermined period.

In an example of ignition timing control performed by the engine control unit 100 in accordance with the present invention, a fundamental advanced angle of crank rotation corresponding to a fundamental ignition timing is determined based on the engine speed represented by the detection output signal Sn and the negative pressure in the intake passage 4 represented by the detection output signal Sb, and when the command signal Pj is supplied to the engine control unit 100 from the transmission control unit 200, a first retarding angle of crank rotation is provided for causing an actual ignition timing to be retarded compared with the fundamental ignition timing so as to suppress torque shock resulting from the speed change operation carried out in the automatic transmission 10. Further, when the knocking in the vehicle engine 1 represented by the detection output signal Sk is larger in magnitude than a predetermined value, a second retarding angle of crank rotation is provided for causing the actual ignition timing to be retarded compared with the fundamental ignition timing so as to suppress the knocking.

Figure 5A:
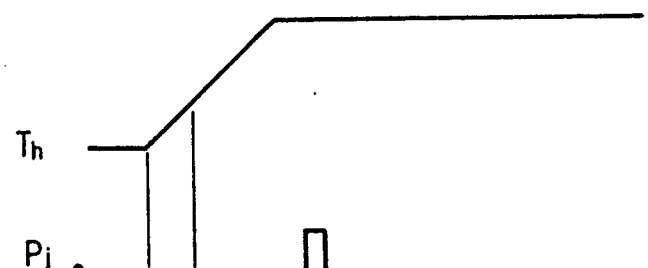
Figure 5B:
Figure 5C:
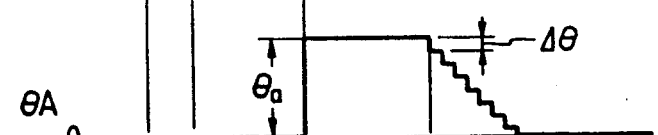

In a situation in which the examples of speed change control and ignition timing control according to the present invention are thus carried out by the transmission control unit 200 and the engine control unit 100, respectively, when a throttle opening degree Th is commenced to increase at a time point $t_0$ and a condition for the second to first or third to second shifting-down operation is detected at a time point $t_1$, as shown in FIG. 5A, the command signal Pj is supplied to the engine control unit 100 from the transmission control unit 200 at a time point $t_2$ after a predetermined period Ta, which is selected to correspond to time lag in operation of the power transmitting gear arrangement 20, has lapsed from the time point $t_1$, as shown in FIG. 5B, and a retarding angle $\theta A$ is set to have an initial value $\theta a$ at the time point $t_2$, as shown in FIG. 5C.

The retarding angle $\theta A$ is maintained to be a during a predetermined period Tr from the time point $t_2$ to a time point $t_3$ at which the termination of the shifting-down operation is anticipated, and then reduced step by step by a small angle $\Delta \theta$ at each step after the time point $t_3$ so as to be zero at a time point $t_4$, as shown in FIG. 5C. An effective angle $\theta$ of crank rotation corresponding to the actual ignition timing is obtained by subtracting the retarding angle $\theta A$ from the fundamental advanced angle $\theta B$, so that a spark advance is reduced by the retarding angle $\theta A$ in a period from the time point $t_2$ to the time point $t_4$.

Figure 5D:
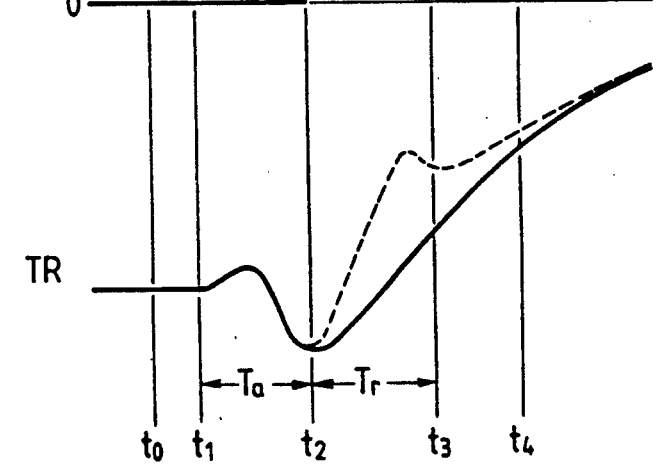

Accordingly, a torque TR produced by the vehicle engine 1 and obtained on the output shaft 45 of the automatic transmission 10 is reduced after the time point $t_2$, as shown by a solid line in FIG. 5D, as compared with a torque obtained without the reduction in spark advance as shown in a broken line in FIG. 5D, so that the torque shock resulting from the second to first or third to second shifting-down operation is suppressed effectively.

In the case where the shifting-down operation is carried out in the automatic transmission 10 as described above, since a gear ratio in the power transmitting gear arrangement 20 is increased and in addition it is usual that the throttle opening degree is increased so that the torque produced by the vehicle engine 1 is also increased, the speed of the vehicle engine 1 is not to be constant at a time point at which each shifting-down operation is terminated. Accordingly, in the above described examples of speed change control and ignition timing control according to the present invention, the time point at which the shifting-down operation is to be terminated in the automatic transmission 10 is not calculated based on the speed of the vehicle engine 1 but determined, as the time point $t_3$, in accordance with the lapse of the predetermined period Tr after the time point $t_2$ at which the shifting-down operation is actually commenced. This results in that the control for reducing the torque produced by the vehicle engine 1 is carried out appropriately to suppress torque shock resulting from the shifting-down operation effectively.

On the other hand, when the traveling speed V of the vehicle increases as shown in FIG. 6A and a condition for the shifting-up operation is detected at a time point $t_1'$, a speed Nn of the vehicle engine 1 which is slightly increased immediately after the time point $t_1'$ is then decreased suddenly in response to the change in gear ratio in the power transmitting gear arrangement 20, as shown in FIG. 6B, and the command signal Pj is supplied to the engine control unit 100 from the transmission control unit 200 at a time point $t_2'$ at which the shifting-up operation is actually commenced in the automatic transmission 10 after a predetermined period Ta' has lapsed from the time point $t_1'$, as shown in FIG. 6C. The retarding angle $\theta A$ is set to have the initial value $\theta a$ at the time point $t_2'$, as shown in FIG. 6D.

After the time point $t_2'$, a calculated engine speed Nu at a time point where the shifting-up operation is to be terminated is obtained, based on speeds taken before and after the shifting-up operation indicated by the speed indicating signal Cs, in accordance with the equation:

$$Nu = Nx \cdot G_i / G_{i-1}$$

where Nx represents the speed Nn of the vehicle engine 1 immediately before the shifting-up operation, $G_{i-1}$ represents the gear ratio in the power transmitting gear arrangement immediately before the shifting-up operation, and $G_i$ represents the gear ratio in the power transmitting gear arrangement 20 immediately after the shifting-up operation.

Then, a time point $t_3'$ at which the shifting-up operation is anticipated is determined as a time point at which the speed Nn of the vehicle engine 1 is equal to or lower than the calculated engine speed Nu. The retarding angle $\theta A$ is maintained to be a during a period from the time point $t_2'$ to the time point $t_3'$ and then reduced step by step by a small angle $\Delta \theta$ at each step after the time point $t_3'$ so as to be zero at a time point $t_4'$, as shown in FIG. 6D. An effective angle $\theta$ of crank rotation corresponding to the actual ignition timing is obtained by subtracting the retarding angle $\theta A$ from the fundamental advanced angle $\theta B$, so that the spark advance is reduced by the retarding angle $\theta A$ in a period from the time point $t_2'$ to the time point $t_4'$.

Accordingly, the torque TR produced by the vehicle engine 1 and obtained on the output shaft 45 of the automatic transmission 10 is reduced after the time point $t_2'$, so that the torque shock resulting from the shifting-up operation is suppressed effectively.

In the case of the shifting-up operation thus carried out in the automatic transmission 10, since the throttle opening degree Th is not varied usually, the time point $t_3'$ which is calculated based on the speed Nn of the vehicle engine 1 as the time point at which the termination of the shifting-up operation is anticipated corresponds appropriately to a time point at which the shifting-up operation is actually terminated and therefore the control for varying the torque produced by the vehicle engine 1 so as to suppress the torque shock resulting from each of the shifting-down operation is performed timely and effectively.

In the case where the command signal Pj is supplied to the engine control unit 100 from the transmission control unit 200 and thereby the retarding angle $\theta A$ is set to have the initial value $\theta a$ at a time point $t_1''$, as shown in FIGS. 7A and 7B, and a knocking which is larger in magnitude than a predetermined value arises in the vehicle engine 1 at a time point $t_2''$ immediately after the time point $t_1''$, a retarding angle $\theta K$ of crank rotation is provided to have an initial value corresponding to the magnitude of the knocking, as shown in FIG. 7C. In such a case, a final retarding angle $\theta R$ of crank rotation is formed with one of the retarding angles $\theta A$ and $\theta K$ which is larger than the other of the retarding angles $\theta A$ and $\theta K$, as shown in 7D, and the effective angle $\theta$ corresponding to the actual ignition timing is obtained by subtracting the final retarding angle $\theta R$ from a fundamental advanced angle $\theta B$. Accordingly, the final retarding angle $\theta R$ is prevented from being large excessively, such as shown by a broken line in FIG. 7D, under a condition in which the retarding angles $\theta A$ and $\theta K$ are provided simultaneously and therefore the output of the vehicle engine 1 is prevented from being reduced in excess of necessity.

In the case where the second to first or third to second shifting-down is detected at a time point $t_a$ and the command signal Pj is supplied to the engine control unit 100 from the transmission control unit 200 so that the retarding angle $\theta A$ is set to have the initial value $\theta a$ at a time point $t_b$ after the predetermined period Ta has lapsed from the time point $t_a$, as shown in FIGS. 8A and 8B, and then a further second to first or third to second shifting-down operation is newly detected at a time point $t_c$ immediately after the time point $t_b$, the command signal Pj is again supplied to the engine control unit 100 from the transmission control unit 200 and the retarding angle $\theta A$ is reset to have the initial value $\theta a$ at a time point $t_d$ after the predetermined period Ta has lapsed from the time point $t_c$, as shown in FIGS. 8A and 8B. Accordingly, the control for suppressing torque shock caused by each second to first or third to second shifting-down operation is surely achieved.

Further, in the case where the second to first or third to second shifting-down operation is detected at a time point $t_a'$ and the next second to first or third to second shifting-down operation is detected at a time point $t_b'$ before a time point $t_c'$ at which the predetermined period Ta has lapsed from the time point $t'$, as shown in a FIGS. 9A and 9B, the command signal Pj is not supplied to the engine control unit 100 from the transmission control unit 200 at the time point $t_c'$ but supplied to the engine control unit 100 from the transmission control unit 200 at a time point $t_d'$ after the predetermined period Ta has lapsed from the time point $t_b'$, as shown in FIGS. 9A and 9B. Consequently, the control for suppressing torque shock caused by each second to first and third to second shifting-down operation is surely achieved under a condition in which the second to first and third to second shifting-down operation is carried out in a relatively short period.

The example of the control for suppressing the torque shock resulting from the speed change operation as described above is not carried out so as to prevent the torque TR from being reduced when the fourth to third shifting-down operation is detected, for the following reason. In a condition in which the third or fourth speed range is taken in the power transmitting gear arrangement 20, the 3-4 clutch 38 is maintained in engagement and thereby rotary inertia on the output shaft 45 of the automatic transmission 10 is relatively large, so that variations in torque on the output shaft 45 of the automatic transmission 10 are restricted. In addition to this, a variation in gear ratio in the power transmitting gear arrangement 20 caused by the fourth to third shifting-down operation is smaller than a variation in gear ratio in the power transmitting gear arrangement 20 caused by the second to first or third to second shifting-down operation. Consequently, it is not feared that the fourth to third shifting-down operation brings about a relatively large torque shock on the output shaft 45 of the automatic transmission 10.

The above described example of speed change control by the transmission control unit 200 is effected mainly by the microcomputer contained in the transmission control unit 200 and the above described example of ignition timing control by the engine control unit 100 is effected mainly by the microcomputer contained in the engine control unit 100.

Figure 10:
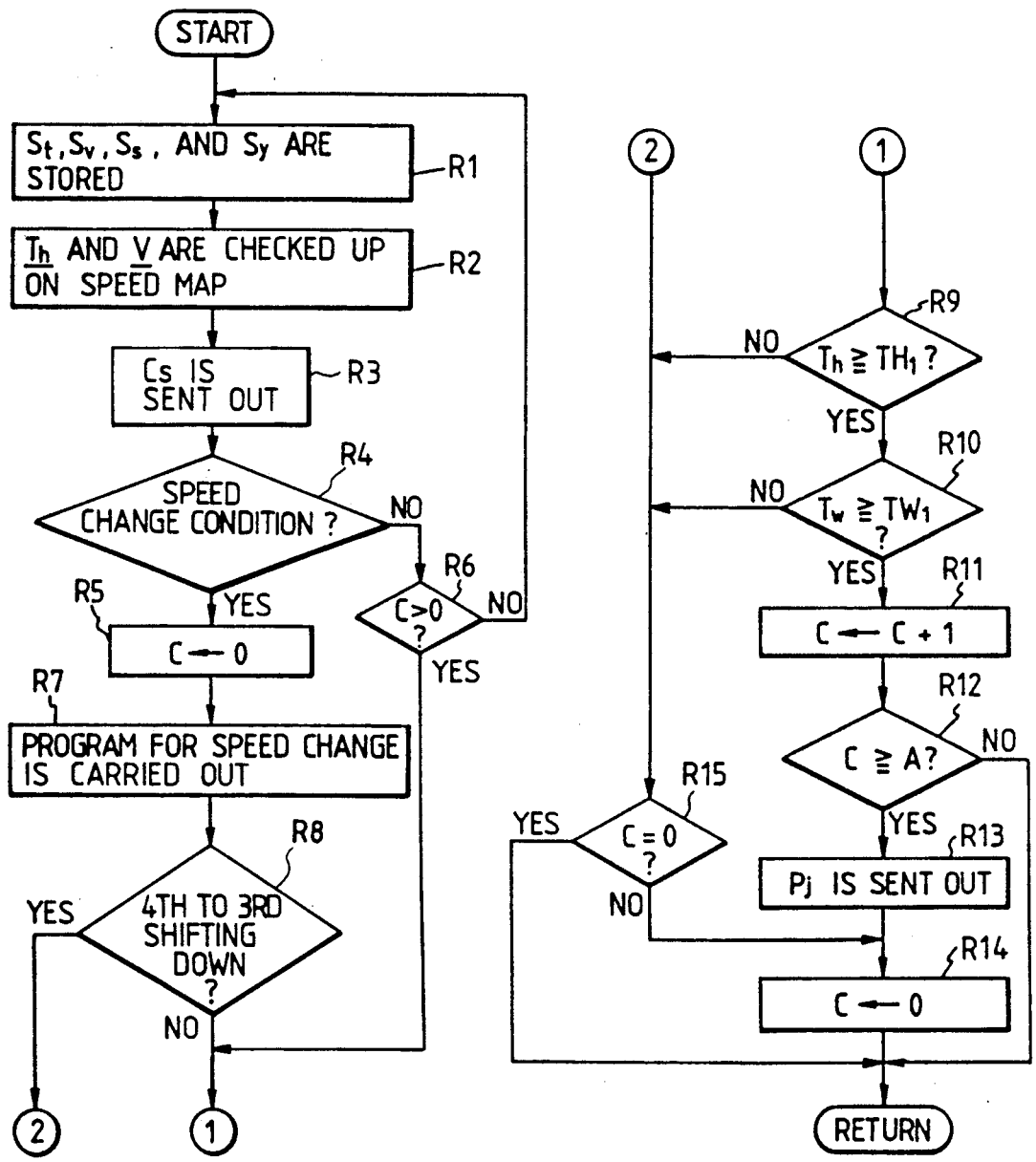

One example of an operation program for the above described example of speed change control is carried out in the microcomputer contained in the transmission control unit 200 in accordance with a flow chart shown in FIG. 10.

According to the flow chart shown in FIG. 10, first, in step R1, the detection output signals St, Sv, Ss and Sy are stored, and in step R2, throttle opening degree Th represented by the detection output signal St and vehicle traveling speed V represented by the detection output signal Sv are checked up on a speed change characteristic map, such as shown in FIG. 4, memorized in a memory contained in the transmission control unit 200. Then, in step R3, the speed indicating signal Cs, which represents the speed taken in the power transmitting gear arrangement 20 on that occasion, is sent out.

Next, in step R4, it is checked, based on a result of the checking up in the step R2, whether a speed change condition is satisfied or not, that is, a speed change operation is to be performed or not. If the speed change operation is to be performed, a counted value C of a counter contained in the transmission control unit 200 is set to be 0, in step R5, and an operation program for speed change is carried out, in step R7.

After that, in step R8, it is checked whether the speed change operation is conducted for fourth to third shifting down or not, in step R8. If the speed change operation is not conducted for fourth to third shifting down, it is checked whether the throttle opening degree Th is equal to or larger than $TH_1$ or not, in step R9. If the throttle opening degree Th is equal to or larger than $TH_1$, it is checked whether cooling water temperature Tw represented by the detection output signal Sw is equal to or higher than $TW_1$ or not, in step R10. If the cooling water temperature Tw is equal to or higher than $TW_1$, the counted value C is increased by 1, in step R11.

Then, in step R12, it is checked whether the counted value C is equal to or larger than a predetermined value A which corresponds to the predetermined period Ta or not. If the counted value C is smaller than the predetermined value A, the process returns to the step R1. On the other hand, the counted value C is equal to or larger than the predetermined value A, the command signal Pj is sent out, in step R13. After that, in step R14, the counter is stopped to operate and the counted value C is set to be 0, then the process returns to the step R1.

When it is clarified in the step R4 that the speed change operation is not to be performed, it is checked whether the counted value C is larger than 0 or not, in step R6. If the counted value C is 0, the process returns to the step R1, and if the counted value C is larger than 0, the process advances to the step R9.

Further, in the case where the speed change operation is not conducted for the fourth to third shifting down as a result of the check in the step R8, the throttle opening degree Th is smaller than $TH_1$ as a result of the check in the step R9, or the cooling water temperature Tw is lower than $TW_1$ as a result of the check in the step R10, it is checked whether the counted value C is 0 or not, in step R15. If the counted value C is not 0, the process advances to the step R14, and if the counted value C is 0, the process returns to the step R1.

One example of an operation program for the aforementioned example of ignition timing control is carried out in the microcomputer contained in the engine control unit 100 in accordance with a flow chart shown in FIGS. 11-a and 11-b.

According to the flow chart shown in FIGS. 11-a and 11-b, first, in step R21, the detection output signals Sn, Sc, Sw, Sk, Sb, St and Sx are stored, and then, the fundamental advanced angle $\theta B$ of crank rotation corresponding to the fundamental ignition timing is calculated based on the engine speed represented by the detection output signal Sn and the negative pressure in the intake passage represented by the detection output signal Sb, in step R22.

Next, in step R23, it is checked whether throttle opening degree Th represented by the detection output signal St is equal to or larger than $TH_1$ or not. If the throttle opening degree Th is equal to or larger than $TH_1$, it is further checked whether cooling water temperature Tw is equal to or higher than $TW_1$, in step R24. When the cooling water temperature Tw is equal to or higher than $TW_1$, it is checked whether the command signal Pj has been sent out or not, in step R25.

If it is clarified in the step R25 that the command signal Pj has been sent out, the calculated engine speed Nu at the time point where the speed change operation is to be terminated is obtained, based on the speed Nn of the vehicle engine 1 on that occasion, the gear ratio $G_{i-1}$ immediately before the speed change operation, and the gear ratio $G_i$ immediately after the speed change operation, in accordance with the equation: $Nu = Nn \cdot G_i/G_{i-1}$, in step R26. Then, the retarding angle $\theta A$ is set to have the initial value $\theta a$ in step R27, a flag FR is set to be 1 in step R28, and a counted value U of a counter contained in the engine control unit 100 is set to be 0 in step R29, and the process advances to step R31.

In the step R31, the retarding angle $\theta K$, which is determined in another operation program for determining the retarding angle described later, is stored. Then, in step R32, it is checked whether the retarding angle $\theta A$ is larger than the retarding angle $\theta K$ or not. If the retarding angle $\theta A$ is larger than the retarding angle $\theta K$, the retarding angle $\theta A$ is adopted as the final retarding angle $\theta R$, in step R33, and if the retarding angle $\theta A$ is equal to or smaller than the retarding angle $\theta K$, the retarding angle $\theta K$ is adopted as the final retarding angle $\theta R$, in step R34.

After the retarding angle $\theta A$ or $\theta K$ is adopted as the final retarding angle $\theta R$, the effective angle $\theta$ of crank rotation corresponding to the actual ignition timing is calculated by subtracting the final retarding angle $\theta R$ from the fundamental advanced angle $\theta B$, in step R35. Then, in step R36, the ignition control signal SCq which corresponds to the effective angle $\theta$ obtained in the step R35 is produced and sent out to the ignitor 8, and thereafter, the process returns to the step R21.

In the case where the throttle opening degree Th is smaller than $TH_1$ as a result of the check in the step R23 or the cooling water temperature Tw is lower than $TW_1$ as a result of the check in the step R24, the flag FR is set to be 0 in step R37 and the retarding angle $\theta A$ is set to be 0° in step R38. Then, the process advances to the step R31.

Further, when it is clarified in the step R25 that the command signal Pj has not been sent out, it is checked whether the flag FR is set to be 1 or not, in step R40. If the flag FR is set to be 0, the process advances to the step R38, and if the flag FR is set to be 1, the process advances to step R41.

In the step R41, it is checked whether the speed change operation is conducted for shifting down or not. If the the speed change operation is conducted for shifting down, the counted value U is increased by 1, in step R42, and then it is checked whether the counted value U is equal to or larger than a predetermined value E which is set to correspond to the period Tr, in step R43. If the counted value U is equal to or larger than the predetermined value E, the retarding angle $\theta A$ is renewed by subtracting the small angle $\Delta \theta$, in step R44, and it is checked whether the retarding angle $\theta A$ renewed in the step R45 is smaller than 0°, namely, negative or not, in step R45. If the retarding angle $\theta A$ renewed in the step R44 is smaller than 0°, the retarding angle $\theta A$ is set to be 0° in step R46, and the flag FR is set to be 0 in step R47, then the process advances to the step R32. If the retarding angle $\theta A$ is equal to or larger than 0 as a result of the check in the step R45, the process advances to the step R47 directly from the step R45.

When it is clarified in the step R41 that the speed change operation is not conducted for shifting down, it is checked whether the speed Nn of the vehicle engine 1 is equal to or lower than the calculated engine speed Nu or not, in step R48. If the the speed Nn of the vehicle engine 1 is equal to or lower than the calculated engine speed Nu, the process advances to the step R44. Further, if the speed Nn of the vehicle engine 1 is higher than the calculated engine speed Nu as a result of the check in the step R48, or the counted value U is smaller than the predetermined value E as a result of the check in the step R43, the process advances to the step R32.

The operation program for determining the retarding angles $\theta K$ is carried out in accordance with a flow chart shown in FIG. 12 in the microcomputer contained in the engine control unit 100.

According to the flow chart shown in FIG. 12, in step R51, the detection output signal Sk is stored, and it is checked based on the detection output signal Sk whether the knocking in the vehicle engine 1 is larger in magnitude than a predetermined value or not, in step R52. If the knocking in the vehicle engine 1 is larger in magnitude than the predetermined value, the retarding angle $\theta K$ is determined in response to the magnitude of the knocking, in step R53, and the process returns to the step R51.

To the contrary, when it is clarified in the step R52 that the knocking in the vehicle engine 1 is not larger in magnitude than the predetermined value, the retarding angle $\theta K$ is renewed by subtracting the small angle $\Delta \theta$, in step R54. Then, it is checked whether the retarding angle $\theta K$ is smaller than 0°, namely, negative or not, in step R55. If the retarding angle $\theta K$ is smaller than 0°, the retarding angle $\theta K$ is set to be 0°, in step R56, and then the process returns to the step R51. Further, if the retarding angle $\theta K$ is equal to or larger than 0° as a result of the check in the step R55, the process returns to the step R51 directly from the step R55.

Figure 13A:
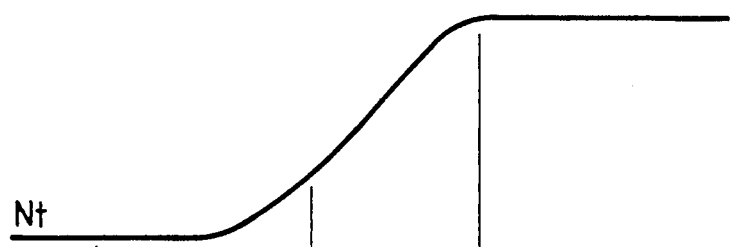
FIGS. 13A to 13C and 14A to 14C are time charts used for explaining a second example of control operation of the embodiment shown in FIG. 2.
Figure 13B:
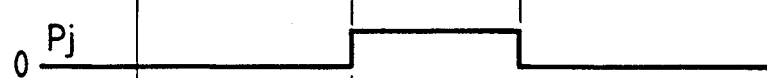
Figure 13C:
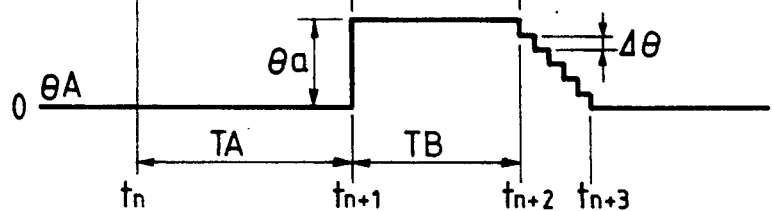

In the case where another examples of the speed change control and the ignition timing control according to the present invention are carried out by the transmission control unit 200 and the engine control unit 100, respectively, when a turbine speed Nt in the torque converter 14 employed in the automatic transmission 10 is varied as shown in FIG. 13A and a condition for a shifting-down operation is detected at a time point $t_n$ shown in FIG. 13A, the command signal Pj is started to be supplied to the engine control unit 100 from the transmission control unit 200 at a time point $t_{n+1}$ after a predetermined period TA, which is selected to correspond to time lag in operation of the power transmitting gear arrangement 20, has lapsed from the time point $t_n$, as shown in FIG. 13B, and a retarding angle $\theta A$ is set to have an initial value $\theta a$ at the time point $t_{n+1}$, as shown in FIG. 13C. The retarding angle $\theta A$ is maintained to be a during a period TB from the time point $t_{n+1}$ to a time point $t_{n+2}$ at which the termination of the shifting-down operation is anticipated and the command signal Pj is ceased to be supplied to the engine control unit 100 from the transmission control unit 200, and then reduced step by step by a small angle $\Delta \theta$ at each step after the time point $t_{n+2}$ so as to be zero at a time point $t_{n+3}$, as shown in FIG. 13C. An effective angle of crank rotation corresponding to the actual ignition timing is obtained by subtracting the retarding angle $\theta A$ from a fundamental advanced angle $\theta B$, so that a spark advance is reduced by the retarding angle $\theta A$ in a period from the time point $t_{n+1}$ to the time point $t_{n+3}$.

Accordingly, a torque produced by the vehicle engine 1 and obtained on the output shaft 45 of the automatic transmission 10 is reduced after the time point $t_{n+1}$, so that the torque shock resulting from the shifting-down operation is suppressed effectively.

Figure 14A:
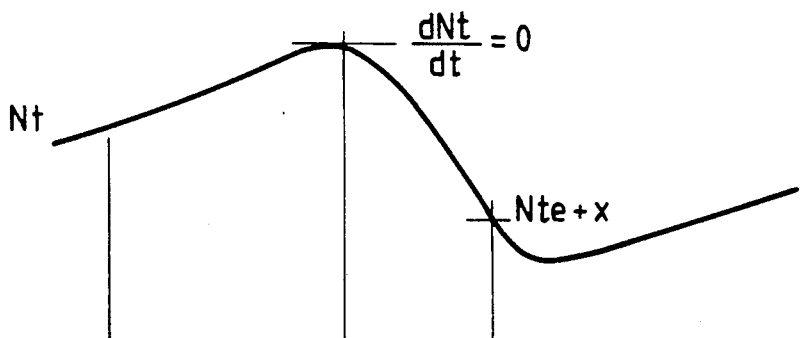
Figure 14B:
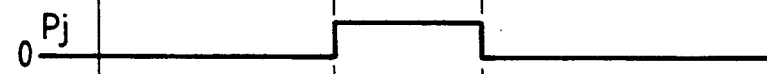
Figure 14C:
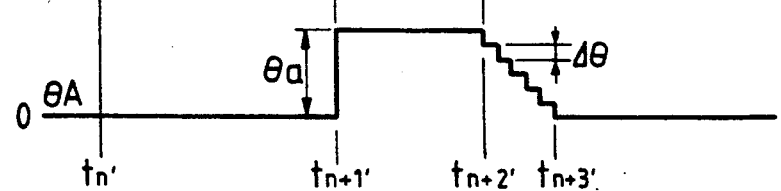

On the other hand, when the turbine speed Nt increases as shown in FIG. 14A and a condition for the shifting-up operation is detected at a time point $t_n'$, the command signal Pj is started to be supplied to the engine control unit 100 from the transmission control unit 200 at a time point $t_{n+1}'$ at which the shifting-up operation is actually commenced in the automatic transmission 10 and a ratio of change dNt/dt of the turbine speed Nt is zero, as shown in FIGS. 14A and 14B. The retarding angle θA is set to have the initial value θa at the time point $t_{n+1}'$, as shown in FIG. 14C.

After the time point $t_{n+1}'$, a calculated turbine speed Nte at a time point where the shifting-up operation is to be terminated is obtained, based on speeds taken before and after the shifting-up operation indicated by the speed indicating signal Cs, in accordance with the equation:

$$Nte = Ntb \cdot G_i / G_{i-1}$$

where Ntb represents the turbine speed Nt immediately before the shifting-up operation, $G_{i-1}$ represents the gear ratio in the power transmitting gear arrangement 20 immediately before the shifting-up operation, and $G_i$ represents the gear ratio in the power transmitting gear arrangement 20 immediately after the shifting-up operation. Then, a time point $t_{n+2}'$ at which the turbine speed Nt is equal to or lower than a calculated turbine speed Nte+x which is higher slightly than the calculated turbine speed Nte at the time point at which the shifting-up operation is anticipated to be terminated is determined, as shown in FIG. 14A, and the command signal Pj is ceased to be supplied to the engine control unit 100 from the transmission control unit 200 at the time point $t_{n+2}'$, as shown in FIG. 14B. The retarding angle θA is maintained to be a during a period from the time point $t_{n+1}'$, to the time point $t_{n+2}'$ and then reduced step by step by a small angle Δθ at each step after the time point $t_{n+2}'$ so as to be zero at a time point $t_{n+3}'$, as shown in FIG. 14C. An effective angle θ of crank rotation corresponding to the actual ignition timing is obtained by subtracting the retarding angle θA from the fundamental advanced angle θB, so that the spark advance is reduced by the retarding angle θA in a period from the time point $t_{n+1}'$ to the time point $t_{n+3}'$.

Accordingly, the torque produced by the vehicle engine 1 and obtained on the output shaft 45 of the automatic transmission 10 is reduced after the time point $t_{n+1}'$, so that the torque shock resulting from the shifting-up operation is suppressed effectively.

One example of an operation program for the above described another example of speed change control is carried out in the microcomputer contained in the transmission control unit 200 in accordance with a flow chart shown in FIGS. 15-a and 15-b.

According to the flow chart shown in FIGS. 15-a and 15-b, first, in step Q1, the detection output signals St, Sv, Ss and Sy are stored, and in step Q2, the turbine speed Nt is stored. Then, the speed indicating signal Cs, which represents the speed taken in the power transmitting gear arrangement 20 on that occasion, is sent out, in step Q3.

Next, in step Q4, it is checked whether a speed change condition is satisfied or not, that is, a speed change operation is to be performed or not. If the speed change operation is to be performed, it is further checked whether the speed change operation is to be conducted for shifting up or not, in step Q5. When the speed change operation is not to be conducted for shifting up, that is, the speed change operation is to be conducted for shifting down, a flag Fd is set to be 0, in step Q6, and the predetermined period TA is set, in step Q7. Then, the process advances to step Q8. On the other hand, when the speed change operation is to be conducted for shifting up, the flag Fd is set to be 1, in step Q9, and a predetermined period TU is set, in step Q10. Then, the process advances to step Q8. In the step Q8, a counted value C of a counter contained in the transmission control unit 200 is set to be 0. Then, an operation program for speed change is carried out, in step Q11, and a flag Fs is set to be 0, in step Q12.

After that, it is checked whether throttle opening degree Th represented by the detection output signal St is equal to or larger than $Th_1$ or not, in step Q13. If the throttle opening degree Th is equal to or larger than $Th_1$, it is checked whether cooling water temperature Tw represented by the detection output signal Sw is equal to or higher than $Tw_1$ or not, in step Q14. If the cooling water temperature Tw is equal to or higher than $Tw_1$, the counted value C is increased by 1, in step Q15.

Then, in step Q16, it is checked whether the counted value C is equal to or larger than a predetermined value CA which corresponds to the predetermined period TA set in the step Q7 or not. If the counted value C is smaller than the predetermined value CA, the process returns to the step Q1. On the other hand, the counted value C is equal to or larger than the predetermined value CA, the command signal Pj is started to be sent out, in step Q17. After that, in step Q18, a flag Fr is set to be 1, in step Q18, and the flag Fs is set to be 0, in step Q19, then the process returns to the step Q1.

If the throttle opening degree Th is smaller than $Th_1$ as a result of the check in the step Q13 or the cooling water temperature Tw is lower than $Tw_1$ as a result of the check in the step Q14, the process advances to the step Q19.

When it is clarified in the step Q4 that the speed change operation is not to be performed, it is checked whether the flag Fs is 1 or not, in step Q20. If the flag Fs is 1, it is further checked whether the flag Fd is 1 or not, in step Q21. If the flag Fd is 1, it is checked whether the ratio of change dNt/dt of the turbine speed Nt is equal to or smaller than 0 or not, in step Q22. When the ratio of change dNt/dt is equal to or smaller than 0, the calculated turbine speed Nte is obtained in accordance with the equation: $Nte = Ntb \cdot G_i / G_{i-1}$, in step Q23, and then the process advances to the step Q17.

If it is clarified in the step Q21 that the flag Fd is not 1, the process advances to the step Q13, and if it is clarified in the step Q22 that the ratio of change dNt/dt is smaller than 0, the step returns to the step Q1.

Further, when the flag Fs is not 1 as a result of the check in the step Q20, it is checked whether the flag Fr is 1 or not, in step Q24. If the flag Fr is 1, it is further checked whether the flag Fd is 1 or not, in step Q25. If the flag Fd is 1, it is checked whether the turbine speed Nt is equal to or smaller than the calculated turbine speed Nte+x or not, in step Q26. When the turbine speed Nt is equal to or smaller than the calculated turbine speed Nte+x, the command signal Pj is ceased to be sent out, in step Q27 and the flag Fr is set to be 0, in step Q28, then the process returns to the step Q1.

If the flag Fr is not 1 as a result of the check in the step Q24 or the turbine speed Nt is higher than the calculated speed Net+x as a result of the check in the step Q26, the process returns to the step Q1. Further, if the flag Fd is not 1 as a result of the check in the step Q25, the counted value C is increased by 1, in step Q29, and it is checked whether the counted value C is equal to or larger than a predetermined value CB corresponding to the predetermined period TB or not, in step Q30. If the counted value C is equal to or larger than the predetermined value CB, the process advances to the step Q27, and to the contrary, if the counted value C is smaller than the predetermined value CB, the process returns to the step Q1.

Figure 16:
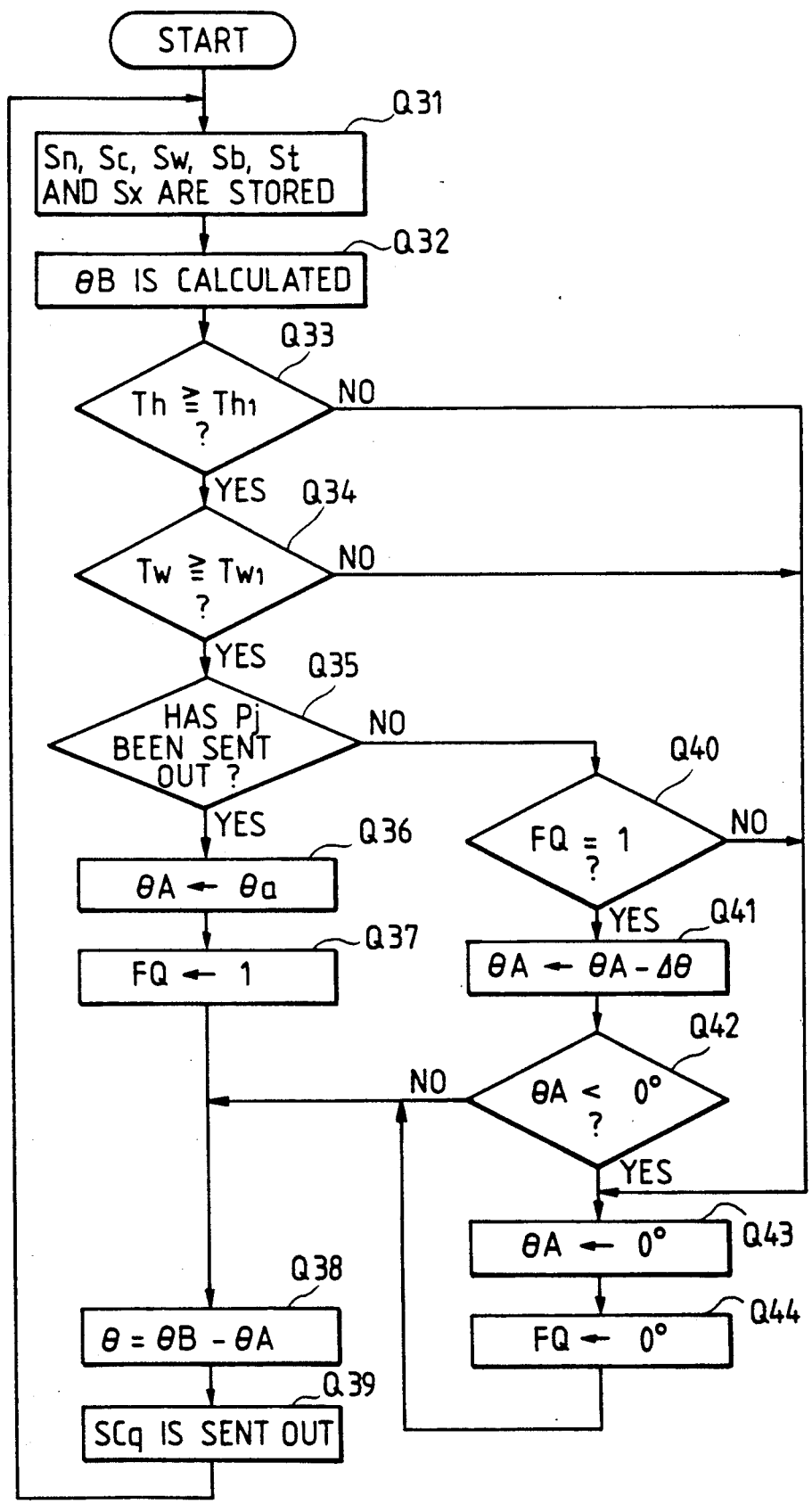

One example of an operation program for the aforementioned another example of ignition timing control is carried out in the microcomputer contained in the engine control unit 100 in accordance with a flow chart shown in FIG. 16.

According to the flow chart shown in FIG. 16, first, in step Q31, the detection output signals Sn, Sc, Sw, Sb, St and Sx are stored, and then, the fundamental advanced angle $\theta B$ of crank rotation corresponding to the fundamental ignition timing is calculated based on engine speed represented by the detection output signal Sn and negative pressure in the intake passage represented by the detection output signal Sb, in step Q32.

Next, in step Q33, it is checked whether throttle opening degree Th represented by the detection output signal St is equal to or larger than $Th_1$ or not. If the throttle opening degree Th is equal to or larger than $Th_1$, it is further checked whether cooling water temperature Tw is equal to or higher than $Tw_1$, in step Q34. When the cooling water temperature Tw is equal to or higher than $Tw_1$, it is checked whether the command signal Pj has been sent out or not, in step Q35.

If it is clarified in the step Q35 that the command signal Pj has been sent out, the retarding angle $\theta A$ is set to have the initial value $\theta a$ in step Q36, a flag FQ is set to be 1 in step Q37, and the effective angle $\theta$ of crank rotation corresponding to the actual ignition timing is calculated by subtracting the retarding angle $\theta A$ from the fundamental advanced angle $\theta B$, in step Q38. Then, in step Q39, the ignition control signal SCq which corresponds to the effective angle $\theta$ obtained in the step Q39 is produced and sent out to the ignitor 8, and thereafter, the process returns to the step Q31.

when it is clarified in the step Q35 that the command signal Pj has not been sent out, it is checked whether the flag FQ is 1 or not, in step Q40. If the flag FQ is 1, the retarding angle $\theta A$ is renewed by subtracting the small angle $\Delta\theta$, in step Q41, and it is checked whether the retarding angle $\theta A$ renewed in the step Q41 is smaller than 0°, namely, negative or not, in step Q42. If the retarding angle $\theta A$ renewed in the step Q41 is smaller than 0°, the retarding angle $\theta A$ is set to be 0° in step Q43, and the flag FQ is set to be 0 in step Q44, then the process advances to the step Q38. If the retarding angle $\theta A$ is equal to or larger than 0 as a result of the check in the step Q42, the process advances to the step Q38 directly from the step Q42.

In the case where the throttle opening degree Th is smaller than $Th_1$ as a result of the check in the step Q33, the cooling water temperature Tw is lower than $Tw_1$ as a result of the check in the step Q34, or the flag FQ is not 1 as a result of the check in the step Q40, the process advances to the step Q43.

Further, although the ignition timing is controlled by the engine control unit 100 for reducing the torque so as to suppress the torque shock resulting from the speed change operation and the knocking in the vehicle engine 1 in the above described examples of ignition timing control, the engine control unit 100 can be arranged to control one or more controllable subjects other than the ignition timing, for example, fuel supply to the vehicle engine 1 or intake air mass flow to the vehicle engine 1, for reducing the torque TR so as to suppress the torque shock resulting from the speed change operation and the knocking in the vehicle engine 1.

What is claimed is:

1. A control system for a vehicle engine coupled with an automatic transmission, the control system comprising:

speed change operation detection means for detecting a condition of speed change operation for varying a gear ratio in a power transmitting gear arrangement provided in the automatic transmission, speed sensing means for detecting a speed of a rotational element relating to the speed change operation of the automatic transmission, first period determining means for determining a first period of time, in which the speed change operation is to be carried out in the automatic transmission said first period of time beginning from a starting point of the speed change operation detected by said speed change operation detecting means, said first period determined by calculating an ending of the speed change operation based on the speed detected by said speed sensing means and gear ratios between which the speed change operation is performed, second period determining means for determining a second period of time, in which the speed change operation is to be carried out in the automatic transmission, in accordance with a predetermined lapse of time beginning from a starting point of the speed change operation detected by said speed change operation detecting means, and torque control means operative to vary torque produced by the vehicle engine so as to suppress torque shock resulting from the speed change operation during the first period of time as determined by said first period determining means when a condition of shifting-up operation is detected by said speed change operation detecting means and to vary the torque so as to suppress torque shock resulting from the speed change operation during the second period of time determined by said second period determining means when a condition of predetermined shifting-down operation is detected by said speed change operation detecting means.

2. A control system according to claim 1, wherein said automatic transmission is accompanied with a control unit operative to control the speed change operation in said automatic transmission in accordance with a predetermined speed change characteristic defined by traveling speed of a vehicle and engine load.

3. A control system according to claim 1, wherein said torque control means is operative to reduce the torque produced by the vehicle engine during said first and second periods of time selectively.

4. A control system according to claim 1, wherein said torque control means is operative to vary the torque produced by the vehicle engine in accordance with a control variable formed by combining at least a fundamental variable obtained based on an operating condition of the vehicle engine and a supplemental variable obtained in response to the speed change operation carried out in the automatic transmission.

5. A control system according to claim 1, wherein said torque control means is operative to control ignition timing for the vehicle engine so as to reduce the torque produced by the vehicle engine.

6. A control system according to claim 1, wherein said first period determining means is operative to cause said first period of time to have a starting time point at which a predetermined period of time has just lapsed after the detection output of said speed change operation detecting means is obtained and an ending time point at which the speed detected by said speed sensing means has reached a predetermined speed, and said second period determining means is operative to cause said second period of time to have a starting time point at which a first predetermined period of time has just lapsed after the detection output of said speed change operation detecting means is obtained and an ending time point at which a second predetermined period of time has just lapsed after said first predetermined period of time has lapsed.

7. A control system according to claim 1, wherein said first period determining means is operative to detect the ending time points of said first period of time based on the speed detected by said speed sensing means so as to be equal to or lower than a calculated speed satisfying the expression: $Nx \cdot G_i/G_{i-1}$, where $Nx$ represent speed of the vehicle engine immediately before the shifting-up operation, $G_{i-1}$ represents a gear ratio in the power transmitting gear arrangement immediately before the shifting-up operation, and $G_i$ represents a gear ratio in the power transmitting gear arrangement immediately after the shifting-up operation.

8. A control system for a vehicle engine coupled with an automatic transmission, the control system comprising:

speed change detecting means for detecting a condition of speed change operation for varying a gear ratio in a power transmitting gear arrangement provided in the automatic transmission, operation start detecting means for detecting a start of speed change operation in the automatic transmission, speed sensing means for detecting a speed of a rotational element relating to the speed change operation of the automatic transmission, first torque control means operative to commence varying torque produced by the vehicle engine so as to suppress torque shock resulting from the speed change operation in response to the start of speed change operation detected by said operation start detecting means and to cease varying the torque produced by the vehicle engine in accordance with the end of a speed change operation calculated based on the speed detected by said speed sensing means and gear ratios between which the speed change is performed when a condition of shifting-up operation is detected by said speed change operation detecting means, and second torque control means operative to commence varying torque produced by the vehicle engine so as to suppress torque shock resulting from the speed change operation in response to the start of speed change operation detected by said operation start detecting means and to cease varying the torque produced by the vehicle engine in accordance with a predetermined lapse of time from the start of speed change operation detected by said operation start detecting means when a condition of shifting-down operation is detected by said speed change operation detecting means.

9. A control system according to claim 8, wherein said automatic transmission is accompanied with a control unit operative to control the speed change operation in said automatic transmission in accordance with a predetermined speed change characteristic defined by traveling speed of a vehicle and engine load.

10. A control system according to claim 9, wherein said operation start detecting means is operative to detect the start of speed change operation based on a predetermined signal generated in connection with the speed change operation in said control unit.

11. A control system according to claim 8, wherein each of said first and second torque control means is operative to reduce the torque produced by the vehicle engine in response to the speed change operation carried out in the automatic transmission.

12. A control system according to claim 8, wherein each of said first and second torque control means is operative to vary the torque produced by the vehicle engine in accordance with a control variable formed by combining at least a fundamental variable obtained based on an operating condition of the vehicle engine and a supplemental variable obtained in response to the speed change operation carried out in the automatic transmission.

13. A control system according to claim 8, wherein each of said first and second torque control means is operative to control ignition timing for the vehicle engine so as to reduce the torque produced by the vehicle engine.

14. A control system according to claim 8, wherein said first torque control means is operative to cease varying the torque produced by the vehicle engine in accordance with the speed detected by said speed sensing means so as to be equal to or lower than a calculated speed satisfying the expression: $Nx \cdot G_i G_{i-1}$, where $Nx$ represent speed of the vehicle engine immediately before the shifting-up operation, $G_{i-1}$ represents a gear ratio in the power transmitting gear arrangement immediately before the shifting-up operation, and $G_i$ represents a gear ratio in the power transmitting gear arrangement immediately after the shifting-up operation.

15. A method of controlling a vehicle engine coupled with an automatic transmission, the method comprising the steps of:

detecting a condition of speed change operation for varying a gear ratio in a power transmitting gear arrangement provided in the automatic transmission, detecting a speed of a rotational element relating to the speed change operation of the automatic transmission, determining a first period of time, in which the speed change operation is to be carried out in the automatic transmission, said first period of time beginning from a starting point of the speed change operation detected by said speed change operation detecting means, said first period determined by calculating an ending of the speed change operation based on the speed detected by said detecting step and gear ratios between which the speed change operation is performed, determining a second period of time, in which the speed change operation is to be carried out in the automatic transmission, in accordance with a predetermined lapse of time beginning from a starting time point of the speed change operation detected by said detecting step, and varying torque produced by the vehicle engine so as to suppress torque shock resulting from the speed change operation during the first period of time when a condition of shifting-up operation is detected and varying the torque so as to suppress torque shock resulting from the speed change operation during the second period of time when a condition of predetermined shifting-down operation is detected.

* * * * *